United States Patent
Mishra et al.

(10) Patent No.: US 9,868,233 B2
(45) Date of Patent: Jan. 16, 2018

(54) MOLDABLE FLY-AWAY TOOL STRUCTURE SYSTEM

(75) Inventors: Suvankar Mishra, Carrollton, TX (US); John R. McCullough, Weatherford, TX (US); Mark Chris, Dallas, TX (US); Stanley B. Woychesin, McKinney, TX (US)

(73) Assignee: Textron Innovations Inc., Providence, RI (US)

( * ) Notice: Subject to any disclaimer, the term of this patent is extended or adjusted under 35 U.S.C. 154(b) by 883 days.

(21) Appl. No.: 13/578,059

(22) PCT Filed: Jul. 15, 2011

(86) PCT No.: PCT/US2011/044241
§ 371 (c)(1),
(2), (4) Date: Aug. 9, 2012

(87) PCT Pub. No.: WO2012/060910
PCT Pub. Date: May 10, 2012

(65) Prior Publication Data
US 2012/0308768 A1 Dec. 6, 2012

Related U.S. Application Data

(60) Provisional application No. 61/410,458, filed on Nov. 5, 2010.

(51) Int. Cl.
*B32B 3/12* (2006.01)
*B29C 44/04* (2006.01)
(Continued)

(52) U.S. Cl.
CPC ........ *B29C 44/0415* (2013.01); *B29C 44/128* (2013.01); *B29C 70/865* (2013.01);
(Continued)

(58) Field of Classification Search
None
See application file for complete search history.

(56) References Cited

U.S. PATENT DOCUMENTS 3,258,861 A    7/1966  Niconchuk
3,873,654 A    3/1975  Smith
(Continued)

FOREIGN PATENT DOCUMENTS

EP    0671250 A1    9/1995
EP    1273418 A2    1/2003
(Continued)

OTHER PUBLICATIONS

"Diviny HT Series Foam Core for Aerospace Applications," data sheet, available on Sep. 18, 2000.*
(Continued)

*Primary Examiner* — David Sample
*Assistant Examiner* — Nicholas W Jordan
(74) *Attorney, Agent, or Firm* — James E. Walton

(57) ABSTRACT

A composite structure includes a first face sheet, a second face sheet, and a foam member located between the first face sheet and the second face sheet. The foam member has a molded contour, the mold contour being configured to provide tooling surface for at least one of the first face sheet and the second face sheet prior to curing of the composite structure. A method of making the foam member includes creating a mold tool having an interior surface which resembles the desired outer contour of the foam member. A mixture is poured into a pour opening in the mold tool. The mixture is allowed to polymerize into a foam as the foam expands and distributes within the mold tool. Vent openings in the mold tool are selectively tailored to control the density of the foam member. The foam member is cured in the mold tool.

5 Claims, 6 Drawing Sheets

(51) Int. Cl.
    *B29C 44/12*     (2006.01)
    *B29C 70/86*     (2006.01)
    *B32B 5/18*     (2006.01)
    *B32B 5/24*     (2006.01)
    *B32B 5/26*     (2006.01)
    *B32B 7/02*     (2006.01)
    *B32B 7/12*     (2006.01)
    *B32B 27/06*     (2006.01)
    *B32B 27/08*     (2006.01)
    *B32B 27/12*     (2006.01)
    *B32B 3/04*     (2006.01)
    *B32B 3/26*     (2006.01)

(52) U.S. Cl.
    CPC ................ *B32B 3/04* (2013.01); *B32B 3/12* (2013.01); *B32B 3/263* (2013.01); *B32B 5/18* (2013.01); *B32B 5/245* (2013.01); *B32B 5/26* (2013.01); *B32B 7/02* (2013.01); *B32B 7/12* (2013.01); *B32B 27/065* (2013.01); *B32B 27/08* (2013.01); *B32B 27/12* (2013.01); *B32B 2262/101* (2013.01); *B32B 2262/106* (2013.01); *B32B 2307/542* (2013.01); *B32B 2605/18* (2013.01); *Y02T 50/433* (2013.01); *Y10T 428/24149* (2015.01); *Y10T 428/249953* (2015.04)

(56) References Cited

U.S. PATENT DOCUMENTS

| | | | |
|---|---|---|---|
| 3,960,631 A | | 6/1976 | Weiss |
| 4,181,287 A | | 1/1980 | Richter et al. |
| 4,543,289 A | * | 9/1985 | Park ................ B32B 5/18 428/304.4 |
| 4,671,471 A | | 6/1987 | Patmont |
| 4,687,691 A | | 8/1987 | Kay |
| 4,828,325 A | | 5/1989 | Brooks |
| 4,917,747 A | * | 4/1990 | Chin ................ B29D 99/0021 428/116 |
| 5,087,511 A | * | 2/1992 | Locey ................ B32B 5/14 428/218 |
| 5,096,384 A | | 3/1992 | Immell |
| 5,112,663 A | | 5/1992 | Morenz et al. |
| 5,518,796 A | * | 5/1996 | Tsotsis ................ B32B 3/12 428/116 |
| 5,580,502 A | * | 12/1996 | Forster ................ B29C 44/186 428/117 |
| 5,773,121 A | | 6/1998 | Meteer et al. |
| 6,068,907 A | * | 5/2000 | Beauregard ............ B32B 5/28 428/76 |
| 6,117,376 A | | 9/2000 | Merkel |
| 2003/0052510 A1 | | 3/2003 | Schonenbach et al. |
| 2003/0061663 A1 | | 4/2003 | Lampel |
| 2004/0043181 A1 | | 3/2004 | Sherwood |
| 2005/0019546 A1 | * | 1/2005 | Dolgopolsky et al. .... 428/317.5 |
| 2009/0155502 A1 | * | 6/2009 | Cournoyer ................ B32B 3/12 428/116 |
| 2009/0220347 A1 | | 9/2009 | Ball et al. |
| 2010/0129589 A1 | | 5/2010 | Senibi et al. |
| 2012/0321835 A1 | * | 12/2012 | Hethcock, Jr. ............ B32B 7/12 428/117 |

FOREIGN PATENT DOCUMENTS

| | | |
|---|---|---|
| EP | 1582328 A1 | 10/2005 |
| EP | 2256034 A1 | 12/2010 |
| GB | 1040948 A | 9/1966 |
| GB | 2120621 A | 12/1983 |
| JP | H04329125 A | 11/1992 |

OTHER PUBLICATIONS

Office Action dated Mar. 16, 2015 from counterpart CA App. No. 2,756,119.
Office Action dated Jan. 25, 2015 from counterpart CA App. No. 2,814,980.
Extended European Search Report from application 11838384 issued from the European Patent Office dated Apr. 15, 2014, 12 pages.
"Moldless Composite Homebuilt Sandwich Aircraft Construction 3rd Edition", pp. 1-3-21, dated Sep. 1, 1983, website address: mbfab.com/aircraft/terfcd/TERFCD/Rutan Plans/Main/MOLDCOMP/MCHSAC.PDF, retrieved on Oct. 14, 2013.
International Search Report and the Written Opinion of the International Searching Authority mailed by ISA/USA, U.S. Patent and Trademark Office dated Dec. 6, 2011 for International Patent Application No. PCT/US11/44241, 8 pages.
Extended European Search Report from application 11186041.7-2422 issued from the European Patent Office dated Dec. 21, 2011, 9 pages.
Office Action dated Jun. 15, 2015 from related CN App. No. 201110364708.1.
Office Action dated Jul. 14, 2015 from counterpart CN App. No. 201180052594.5.
Canadian Examination Report in related Canadian patent application No. 2,814,980, 5 pages, dated Mar. 5, 2014.
Office Action dated Dec. 22, 2014 from counterpart CN App. No. 2011103647081.
Office Action dated Jan. 21, 2015 from counterpart EP App. No. 14164626.5.
Office Action dated Oct. 30, 2014 from counterpart CN App. No. 201180052594.5.
Office Action dated Sep. 30, 2015 from related counterpart CA App. No. 2,814,980.
Examination Report dated Oct. 29, 2015 from related coutnpart EP App. No. 11838384.3.
Office Action dated Dec. 16, 2015 from counterpart CN App. No. 201110364708.1.
Examination Report dated May 11, 2016 from counterpart EP App. No. 11838384.3.

* cited by examiner

MOLDABLE FLY-AWAY TOOL STRUCTURE SYSTEM

TECHNICAL FIELD

The system of the present application relates composite structure. In particular, the system of the present application relates to an efficient method for generating stiffness in a composite structure.

DESCRIPTION OF THE PRIOR ART

Composite structures are often used in aerospace, in part due to the high strength to weight ratio, and desirable fatigue qualities. Structural characteristics of the composite structure, such as stiffness and area moment of inertia, can be tailored through a variety of methods. One common method is use a cellular core material, such as honeycomb core, between an upper and lower face sheet. Another common method is to bond two separately cured composite parts together, thus forming a composite structure assembly.

Referring to FIG. 1, a composite structure 101 is illustrated. The composite structure 101 includes an upper sheet 103, a lower sheet 105, and a honeycomb core member 107 bonded therebetween. Honeycomb core member 107 typically includes a plurality of cells forming a repeating geometric pattern or tessellation. Honeycomb core member 107 is sometimes carved to the desired contour before being assembled with upper sheet 103 and lower sheet 105. The upper sheet 103 and lower sheet 105 are composite materials that are typically cured with heat and/or pressure, while assembled with honeycomb core member 107, to form composite structure 101. Use of a honeycomb core, such as honeycomb core member 107, is common for tailoring the stiffness of composite structures. However, limitations of honeycomb core make it less than desirable in certain situations. For example, the height dimension of the core is one limitation due to the tendency of a tall and narrow core to collapse edgewise when exposed to curing pressure in the curing cycle. Further, shaping core to complex contours is labor intensive and contributes to the possibility of the honeycomb core destabilizing during assembly and curing. Further, it is difficult to accurately control the surface tolerances of the both the upper sheet 103 and lower sheet 105. Even further, the upper sheet 103 and lower sheet 105 sometimes sag into the cells of the honeycomb core member 107 during curing, thus producing dimples in upper sheet 103 and lower sheet 105.

Referring to FIG. 2, a composite structure 201 is illustrated. Composite structure 201 includes a hat stiffener 205 bonded to a face sheet 203, the hat stiffener 205 is used to provide desired stiffness to composite structure 201. Typically, face sheet 203 is formed from composite plies laid-up on a tooled surface. The composite plies are then at least partially cured. Hat stiffener 205 is separately laid-up on tooled surface, and then also at least partially cured. The hat stiffener 205 and face sheet 203 are then assembled and bonded together with an adhesive in an additional curing cycle. As such, manufacturing composite structure 201 typically requires separate unique hand lay-up procedures, a plurality of tools, and three separate curing cycles. The complexity and labor involved in manufacturing composite structure 201 causes the high cost of composite structure 201 to be very undesirable.

Although the developments in composite structures have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
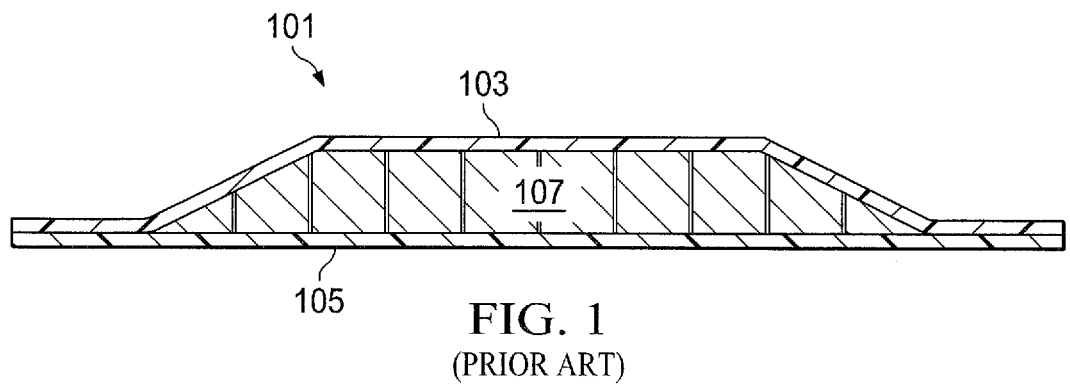
FIG. 1 is a cross-sectional view of a prior art structural system.
Figure 2:
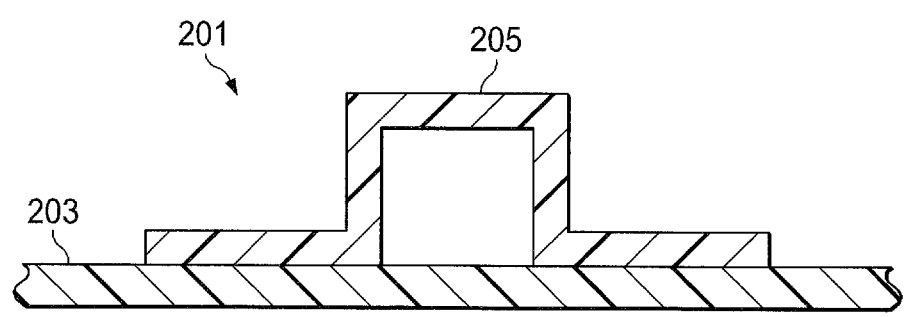
FIG. 2 is cross-sectional view of another prior art structural system.
Figure 3:
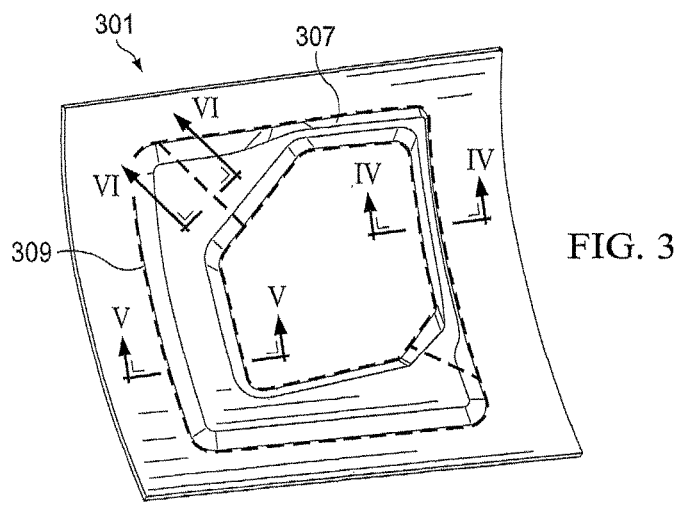
FIG. 3 is a perspective view of a structural system according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 3-6, a composite structure 301, according to the preferred embodiment of the present application, is illustrated. Composite structure 301 includes a first face sheet 303, a second face sheet 305, and a molded foam member 307. Molded foam member 307 provides structural stiffness to composite structure 301. First face sheet 303 and second face sheet 305 preferably comprise a plurality of reinforcing fibers disposed in a polymeric matrix. As discussed further herein, first face sheet 303 and second face sheet 305 are preferably assembled as a plurality of uncured composite plies, and then later cured to form a rigid composite laminate. In an alternative embodiment, one or both of first face sheet 303 and second face sheet 305 are cured prior to assembly with molded foam member 307. It should be appreciated that first face sheet 303 and second face sheet 305 can be formed from a variety of fiber and resin systems. It should also be appreciated that the specific composite material is implementation specific. For example, carbon fiber may be desirable in one application, while fiberglass fiber may be desirable in another application. In the preferred embodiment, first face sheet 303 and second face sheet 305 completely enclose molded foam member 307, as shown in FIG. 4. However, alternative embodiments of composite structure 301 may be configured with foam member 307 partly exposed.

Figure 12:
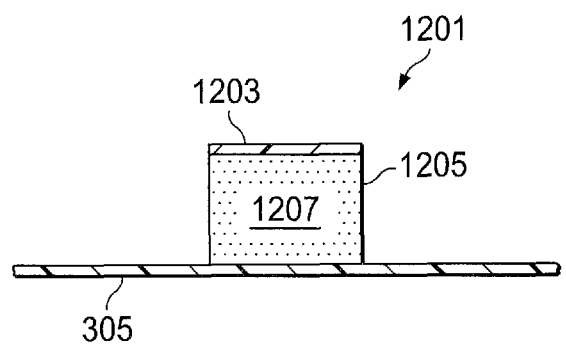
FIG. 12 is a cross-sectional view of a structural system, according to an alternative embodiment of present application.

Referring briefly to FIG. 12, an alternative embodiment composite structure 1201 is illustrated. Composite structure 1201 is similar to composite structure 301, except that a first face sheet 1201 does not completely envelop a foam member 1207. Foam member 1207 is substantially similar to foam member 307. In one embodiment, foam member 1207 is molded in strips that are positioned onto second face sheet 305. Side portions 1205 of foam member 1207 are left exposed. In contrast to composite structure 301, composite structure 1201 is particularly well suited for implementations which the predicted loading does not require the structural joining of first face sheet 1203 and second face sheet 305.

The molded foam member 307 is preferably formed with a pourable and expandable structural foam in a mold, as discussed further herein. The molded foam member 307 is preferably cured prior to assembly with the first face sheet 303 and second face sheet 305. The molded foam member 307 is configured to provide the structural integrity to composite structure 301 in a wide variety of geometries and contours. Molded foam member 307 is particular useful in providing structural stiffness in portions of composite structure 301 where narrow and slender stiffener geometry is required. Curing of composite structure 301 may require pressure, such as autoclave curing pressure, in order to properly cure the first face sheet 303 and second face sheet 305. As such, molded foam member 307 is configured to provide structural resistance to the pressure so as to preserve the desired geometry around molded foam member 307. In contrast, tall and narrow portions of honeycomb core are very susceptible to collapsing when subjected to autoclave pressure and temperature. For example, a honeycomb core portion hypothetically having a height of H1 and width of W1 of foam member 307, would likely crush inward along directions A1, A2, and A3, when subjected to autoclave pressure and temperature. However, foam member 307 is configured to be isotropic, unlike honeycomb core. As such, the isotropic properties of foam member 307 allow it to retain structural integrity in a wide variety of geometries and contours.

Figures 4A, 4B:
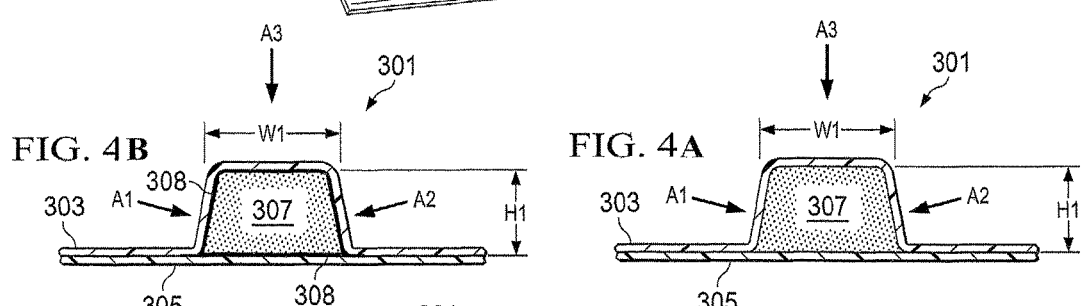
FIG. 4A is a cross-sectional view of the structural system, according to the preferred embodiment of present application, taken along the section lines IV-IV, shown in FIG. 3.
FIG. 4B is a cross-sectional view of the structural system, according to an alternative embodiment of present application, taken along the section lines IV-IV, shown in FIG. 3.
Figure 5:
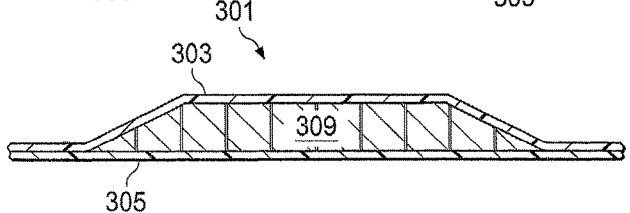
FIG. 5 is a cross-sectional view of the structural system, according to the preferred embodiment of present application, taken along the section lines V-V, shown in FIG. 3.
Figure 6:
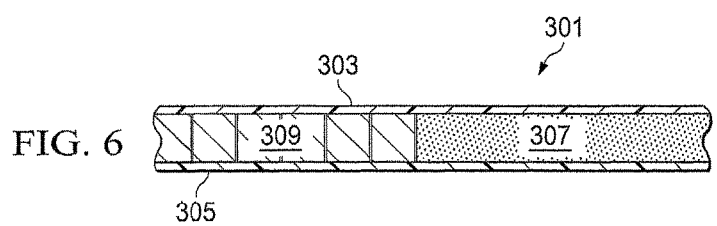
FIG. 6 is a cross-sectional view of the structural system, according to the preferred embodiment of present application, taken along the section lines VI-VI, shown in FIG. 3.

Still referring to FIGS. 3-6, composite structure 301 can optionally also include a honeycomb core member 309 to provide structural stiffness in areas of relative simple geometry and contour. For example, FIG. 5 depicts a portion of composite structure 301 with honeycomb core member 309 being used to provide stiffness. Further, FIG. 6 depicts a section of composite structure 301 where molded foam member 309 and honeycomb core member 309 abut adjacently. An adhesive may be used to bond molded foam member 309 to honeycomb core member 309. It may be desirable to use honeycomb core for structural stiffness where the geometry is relatively simple, while using molded foam wherein the geometry prohibits the use of honeycomb core. However, it should be fully appreciated that molded foam member 307 may be used in lieu of honeycomb core member 309 such that honeycomb core material is not required.

Figure 7A:
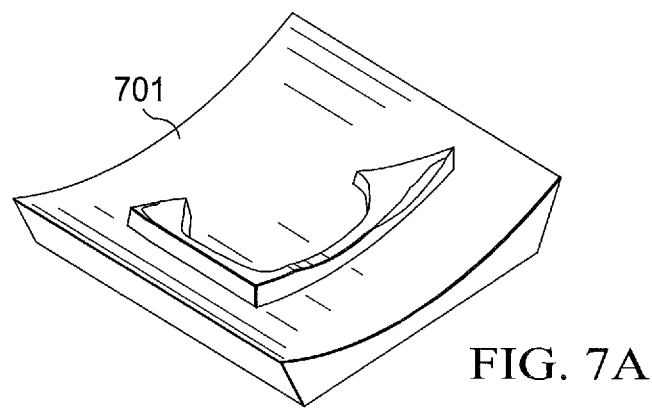
FIGS. 7A-7F are perspective views which illustrated the process for manufacturing a molded foam member, according to the preferred embodiment of present application.
Figure 7B:
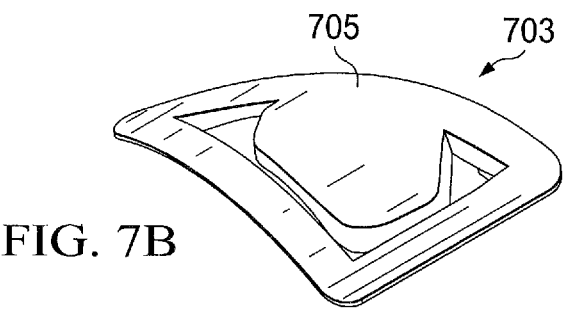

Referring now to FIGS. 7A-7F, the process for manufacturing molded foam member 309 is illustrated. A master tool 701 is fabricated having the desired geometry of foam member 307, as depicted in FIG. 7A. Master tool 701 can be formed from a variety of materials and techniques. For example, master tool 701 can be formed from a selective laser sintering process. Referring to FIG. 7B, a mold tool 703 is derived from the master tool 701. Preferably, a base member 705 of mold tool 703 is manufactured by assembling and curing composite plies on master tool 701. It should also be appreciated that base member 705 of mold tool 703 can be manufacturing without master tool 701; for example, the geometry and contours of foam member 307 can be machined directly into base member 705. Mold tool 703 also includes a lid member 707 (shown in FIGS. 7C, 7D, and 7E) configured to be releasably coupled to base member 705, thereby forming a cavity from which foam member 307 is molded.

Figure 7C:
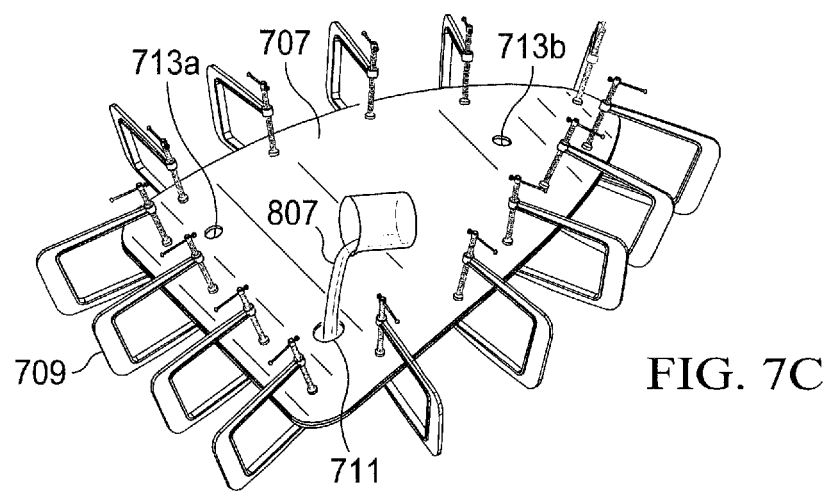
Figure 7D:
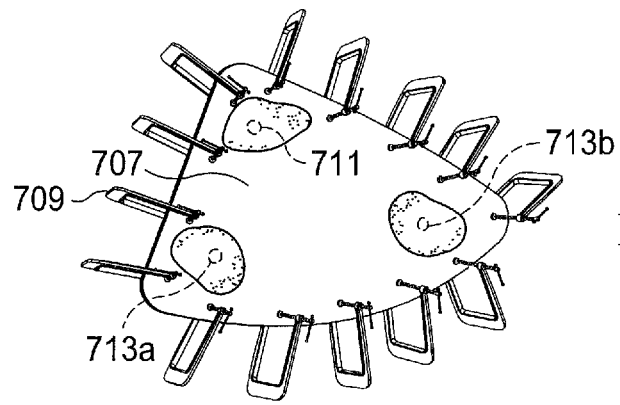

Referring to FIGS. 7C and 7D, a foam mixture 807 (shown in FIG. 10) is poured into a pour opening 711. The pour opening 711 is preferably in a central location so that the foam mixture 807 expands and flows evenly to the extremities of the part. In an alternative embodiment, the foam mixture 807 is distributed into the depression area of base member 705. Then, lid member 707 is attached to the base member 705 with one or more fastening members 709 soon after the pour operation is completed. One or more vent openings, such as vent openings 713a and 713b, are preferably located near the extremities of the part in order to allow for any volatiles to escape during the polymerization stage, and also to facilitate complete homogeneous mold fill. The polymerization stage is the expansion from a chemical reaction of the foam mixture 807. A release agent is preferably applied to the interior of mold tool 703 in order to promote the release and removal of foam member 307 from the mold tool 703.

Figure 8:
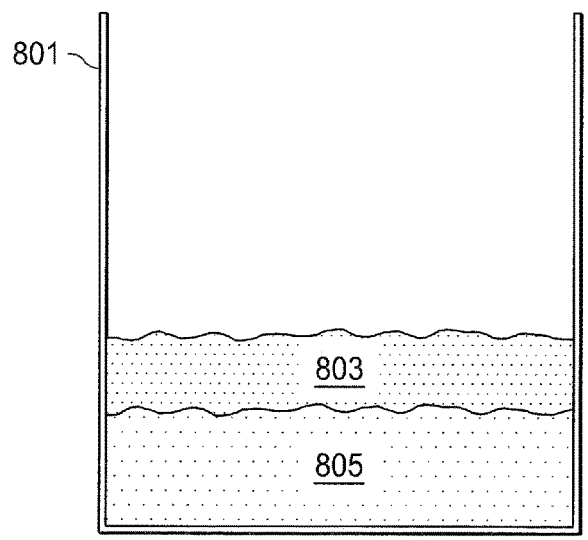
FIG. 8 is a schematic view of components of the foam system used to manufacture the molded foam member, according to the preferred embodiment of present application.
Figure 9:
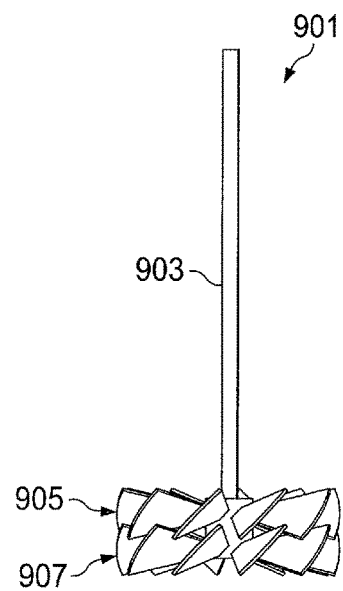
FIG. 9 is a perspective view of a mixer used to mix the foam system, according to the preferred embodiment of present application.
Figure 10:
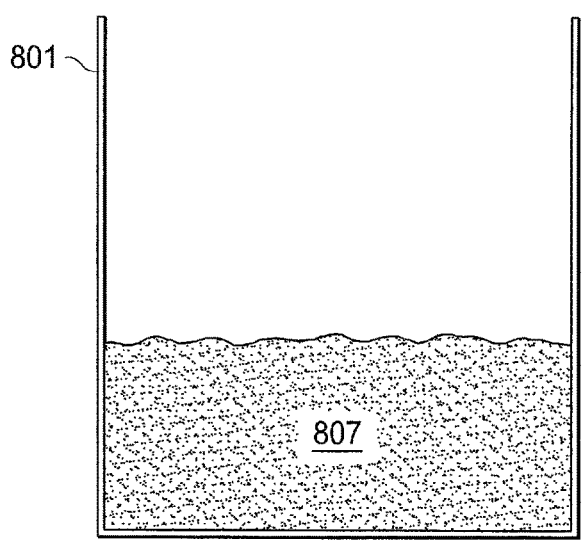
FIG. 10 is a schematic view of a mixture of the foam system used to manufacture the molded foam member, according to the preferred embodiment of present application.

Referring briefly to FIGS. 8-10, the foam system used in the creation of foam member 307 is preferably a urethane foam system that expands to fill mold tool 703. Upon curing, the foam is preferably rigid and flexible, while having a relatively low density. The preferred foam system is a polyisocyanurate pour foam system marketed under the name of Stepanfoam BX 450, by the Stepan Chemical Company. It should be fully appreciated that other foam systems may be used in the molding of molded foam member 307. The Stepanfoam BX 450 includes two separate resin components, namely a resin T (70% by weight) 805 and a resin R (30% by weight) 803. The desired weight amounts of resin T 805 and resin R 803 are measured and poured into a container 801. The resin T 805 and resin R 803 are mechanically agitated to form a homogenous mixture 807. A mixer 901 is used in rotation in order to mix resin T 805 and resin R 803 to form mixture 807. Mixer 901 includes a shaft 903, the shaft 903 being configured to be driven by a drill motor, or the like. Mixer 901 also includes a plurality of blades located on a first blade disc 905 and a second blade disc 907. In the preferred embodiment, mixer 901 is rotated at 3500 revolutions per minute for 10-15 seconds when mixing resin T 805 and resin R 803 to form mixture 807. Once the mixing is complete, it is preferred that mixture 807 is poured into mold tool 703 as quickly as possible. The pouring of mixture 807 is discussed further herein.

The total weight amount of mixture 807 is at least partially dependent upon the desired density and the volume of foam member 307. For example, because density is the relationship is mass per unit volume, the desired density of foam member 307 at least partially dictates the weight amount of mixture 807. However, a small portion of the mixture 807 may escape through openings 711, 713a, and 713b, which affects the final density of foam member 307.

In the preferred embodiment, a "captive process" uses openings 711, 713a, and 713b to allow volatiles to escape during the polymerization of mixture 807, while also creating a desired pressure within mold 703. Pressure within mold 703 inhibits expansion of foam mixture 807 during the polymerization process, thereby increasing the density of the foam member 307. As such, the size and number of openings 711, 713a, and 713b are configured so as to selectively tailor the density of foam member 807. For example, the openings 711, 713a, and 713b in mold tool 703 create a foam member 307 having a density of approximately 12-16 pounds/ft$^3$. However, this size and quantity of openings 711, 713a, and 713b can be increased to produce a foam member 307 of lower density.

In an alternative embodiment, mold 703 may be void of lid member 707 so that the foam mixture 807 is allowed to "free rise" within the base member 705. In the "free-rise" embodiment, a density of approximately 8.0 pounds/ft$^3$ and less can be achieved. The "free rise" embodiment of foam member 307 may be particularly desirable when the geometry and contours of foam member 307 are relatively simple. This is because the exposed surface would require a cutting or shaving operation to trim the exposed surface of foam member 307 to the desired contour.

The density of foam member 307 is preferably customized in accordance with the specific implementation of a foam member 307 in composite structure 301. For example, one type of composite structure 301 may require a higher curing pressure as compared to another composite structure 301; therefore, a foam member 307 used in the composite structure that requires a higher curing pressure may be manufactured having a high density so as to withstand the higher curing pressure of composite structure 101. In one embodiment, composite structure 301 is configured such that the foam member 307 minimally performs the function of physical supporting of first face sheet 303 and second face sheet 305 before and during the curing cycle. In such an embodiment, foam member 307 acts as a "fly-away tool" such that it acts as a tool during the assembly and curing of composite structure 301, but also remains with the composite structure 301 during operation of the aircraft. It should be appreciated that composite structure 301 may also be used in vehicles and structures other than aircraft. Further, when foam member 307 acts simply as a "fly-away tool", a release member 308 may be applied during the assembly of composite structure 301 to prevent bonding contact between first face sheet 303, second face sheet 305, and foam member 307 as shown in FIG. 4B.

The expected operational loading of composite structure 101 is another factor that may contribute to the customization of the density of foam member 307. The density of foam member 307 can be customized in accordance with the desired structural strength of foam member 307. For example, in one embodiment of composite structure 101, foam member 307 may be configured to provide a structural load path between first face sheet 303 and second face sheet 305. In such an embodiment, first face sheet 303 and second face sheet 305 are preferably each in bonding contact with foam member 307. The bonding contact can be created with the resin from each first face sheet 303 and second face sheet 305. The bonding contact can also be created or supplemented with an adhesive layer located between each of the first face sheet 303, second face sheet 305 and foam member 307. The bonding contact facilitates the structural load transfer between first face sheet 303, second face sheet 305, and foam member 307, in a variety of load path directions.

Figure 7E:
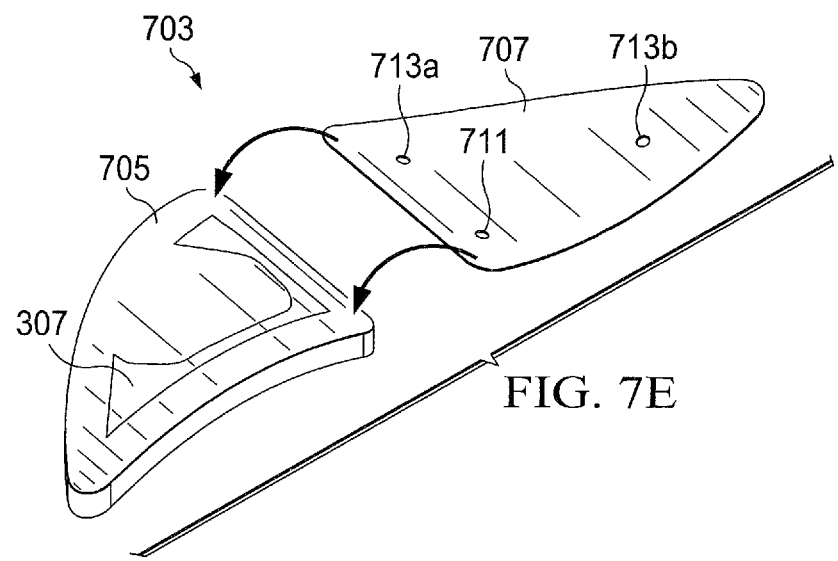

Referring to FIG. 7E, foam member 307 is illustrated while in the base member 705 of mold tool 703. Lid member 707 is removed for clarity. A full cure of foam member is preferred before foam member 307 is removed from base member 705 of mold tool 703. The full cure is achieved by first allowing the foam member 307 to remain within mold tool 703 for at least 24 hours after the expanding of the foam mixture 807 within mold tool 703. Thereafter, the mold tool 703, with foam member 307 remaining therein, is cured between 350° F. and 375° F. for two hours. It should be appreciated that alternative foam systems may require different curing requirements.

Figure 7F:
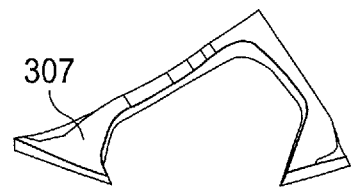

Referring to FIG. 7F, foam member 307 is illustrated separated from mold tool 703. It is preferred that foam member 307 and mold tool 703 is cooled to 150° F. or below, before demolding. Demolding of foam member 307 may require pliable tools to facilitate separation of the foam member 307 from mold tool 703. Once foam member 307 is removed from mold tool 703, then foam member 307 can be assembled with the first face sheet 303 and second face sheet 305 in a composite manufacturing process in order to form composite structure 301. The geometry and contours of foam member 307 are accurate to a high tolerance because of being molded in mold tool 703.

Figure 11:
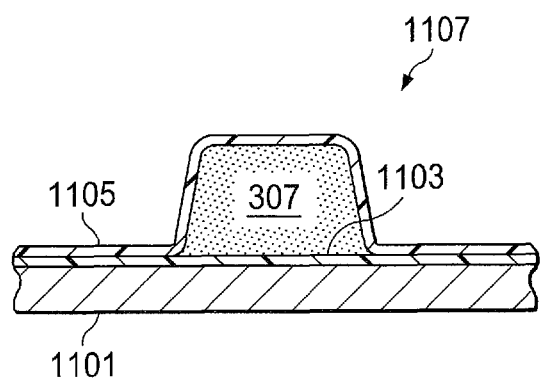
FIG. 11 is a cross-sectional view of an uncured preform of the structural system, according to the preferred embodiment of present application.

Referring to FIG. 11, an uncured preform 1107 of composite structure 301 is illustrated. It should be appreciated that the composite manufacturing process may take on a wide variety of processes in part because first face sheet 303 and second face sheet 305 may be formed from a wide variety of composite fiber/resin systems. For example, in one exemplary embodiment, the composite manufacturing process includes creating preform 1107 by first laying a plurality of pre-impregnated fiber patterns on a surface of a tool 1101, so as form first uncured layer 1101. Next, the foam member 307 is placed at the desired location on layer 1103. Next, a plurality of pre-impregnated fiber patterns are laid upon layer 1103 and foam member 307 to form layer 1105. Foam member 307 acts as a tool by dictating the geometry of layer 1105. Because foam member 307 was formed in a mold tool, the geometry and contours are highly accurate. As such, foam member 307 acts as a high tolerance in the support of layer 1105. Next, the preform 1107 may be vacuum bagged and cured in accordance with one of a variety of conventional composite curing processes. After final curing, preform 1107 becomes composite structure 301.

The system of the present application provides significant advantages, including: (1) providing a stiffness producing foam member in a composite structure that can be molded in a variety of geometries and contours; (2) providing a stiffness producing foam member in a composite structure that can withstand autoclave curing pressure; (3) providing a stiffness producing foam member in a composite structure, the density of the foam member selectively tailored; (4) providing a stiffness producing foam member in a composite structure that provides continuous support for an upper face sheet such that the foam member prevents sagging of the upper face sheet; and (5) providing a stiffness producing foam member in a composite structure that provides continuous support for an upper face sheet such that the foam member prevents sagging of the upper face sheet.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A composite structure, comprising:
 a first face sheet;
 a second face sheet;
 a foam member located between the first face sheet and the second face sheet, the foam member having a molded contour, the molded contour being configured to provide a tooling surface for at least one of both the first face sheet and the second face sheet prior to curing of the composite structure, the foam member being rigid by having a foam body of uninterrupted foam, the molded contour of the foam member being an outer surface of the foam body; and
 a honeycomb core member located between the first face sheet and the second face sheet and the honeycomb member adjacently abutting the foam member, the honeycomb core member configured to provide structural stiffness in the composite structure;
 wherein a release member is used to prevent the foam member from being in bonding contact with the first face sheet and the second face sheet, so as to substantially prevent a shear load between first face sheet and second face sheet from being carried through the foam member.

2. The composite structure according to claim 1, wherein at least one of the first face sheet and the second face sheet is a composite material.

3. The composite structure according to claim 1, wherein the foam member has a side portion left exposed such that the first face sheet and second face sheet does not fully envelop the foam member.

4. The composite structure according to claim 1, wherein the foam member is adhesively bonded to at least one of the first face sheet and the second face sheet, so that the foam member is capable of carrying a shear load between the first face sheet and the second face sheet.

5. The composite structure according to claim 1, wherein the foam member is cured prior to abutting.

* * * * *